United States Patent [19]
Strauss

[11] Patent Number: 6,068,870
[45] Date of Patent: May 30, 2000

[54] APPARATUS AND METHOD OF SEPARATING LIQUID FROM EDIBLE MATERIAL IN A CONTAINER

[76] Inventor: Matthew P. Strauss, 265 Lake St., Apt. 2, East Weymouth, Mass. 02189

[21] Appl. No.: 08/969,033

[22] Filed: Nov. 12, 1997

[51] Int. Cl.[7] .............................. A23B 12/00; B65B 55/00
[52] U.S. Cl. ........................... 426/392; 426/478; 100/37; 100/110; 100/116; 99/495; 99/506
[58] Field of Search .................... 426/489, 392, 426/478; 100/37, 110, 116; 210/464, 470, 471, 472; D7/665, 667; 99/495, 506

[56] References Cited

U.S. PATENT DOCUMENTS

| | | | |
|---|---|---|---|
| 34,241 | 1/1862 | Codding | 100/116 |
| D. 45,533 | 3/1914 | Johnson | D7/686 |
| D. 311,116 | 10/1990 | Pentland | D7/666 |
| D. 330,313 | 10/1992 | Green | D7/666 |
| D. 337,702 | 7/1993 | Lange | D7/665 |
| D. 343,995 | 2/1994 | Djelmane | D7/666 |
| D. 361,697 | 8/1995 | Mc Naughton | D7/667 |
| 468,023 | 2/1892 | Condon | 100/231 |
| 572,936 | 12/1896 | Waters et al. | 100/125 |
| 692,262 | 2/1902 | Geering | 100/234 |
| 1,051,848 | 1/1913 | Luecke | 100/116 |
| 1,107,989 | 8/1914 | Oestreich | 100/116 |
| 1,255,629 | 2/1918 | Mueller | 100/115 |
| 1,446,220 | 2/1923 | Stinebring | 100/132 |
| 3,040,897 | 6/1962 | Holman | 210/244 |
| 3,380,592 | 4/1968 | Arnold | 210/244 |
| 3,392,845 | 7/1968 | Shapiro et al. | 210/474 X |
| 3,995,544 | 12/1976 | Farley | 100/116 |
| 4,860,647 | 8/1989 | Kerslake | 100/234 |
| 4,988,019 | 1/1991 | Dawes | 222/189 |
| 5,272,968 | 12/1993 | Keville et al. | 100/110 |
| 5,272,969 | 12/1993 | McDonald | 100/110 |
| 5,363,759 | 11/1994 | D'Ambrosio | 100/110 |
| 5,372,063 | 12/1994 | Berg | 100/110 |
| 5,501,144 | 3/1996 | Bryson | 100/116 |
| 5,706,721 | 1/1998 | Homes | 100/110 X |

*Primary Examiner*—Milton Cano
*Attorney, Agent, or Firm*—Testa, Hurwitz & Thibeault, LLP

[57] ABSTRACT

An apparatus for separating a liquid from a material in a container includes a plate configured to substantially match an inner contour of the container, the plate having an obverse surface and a reverse surface, a plurality of apertures formed by the plate, and a press element and a pull element on the obverse surface of the plate. A method of separating a liquid from a material in a container includes the steps of removing a lid from the container, inserting the apparatus into an open end of the container, manually compressing the material with the apparatus, and tilting the container to drain the liquid.

20 Claims, 4 Drawing Sheets

APPARATUS AND METHOD OF SEPARATING LIQUID FROM EDIBLE MATERIAL IN A CONTAINER

FIELD OF THE INVENTION

The invention relates generally to food processing and more specifically to an apparatus for separating a liquid from a comestible material in a container.

BACKGROUND OF THE INVENTION

Containerized comestibles such as canned fruits, vegetables, and fish are generally packaged with a liquid to retain color and texture. The liquid is often drained and discarded during food preparation. Various methods for draining the liquid may be employed such as removing the lid and upsetting the contents of the can into a strainer, piercing the lid and inverting the can, or cutting the lid completely and pressing it into the can. Specialized implements for achieving these ends have been developed. For example, one type of implement leaves the cut lid of the container in place and applies pressure to the lid using pivoting handles to squeeze liquid from the material in the container; however, such methods can introduce foreign matters such as dust, dirt, or pathogens present on the outside surface of the lid, contaminating the comestible in the can.

Another limitation of these implements is that they are difficult to clean, often including multiple parts and inaccessible surfaces which cannot be disassembled for cleaning. Other food processing implements include strainers with apertures of uniform diameter having cylindrical walls which are difficult to clean due to food becoming lodged therein.

SUMMARY OF THE INVENTION

A food processing apparatus is disclosed useful for separating a liquid from a material in a wide variety of containers, including, but not limited to, cans containing comestibles like tuna fish packed in oil or water. In one exemplary embodiment, the apparatus includes a plate configured to substantially match an inner planar contour of the container, the plate having an obverse surface and a reverse surface, a plurality of apertures formed by the plate, and a press element and a pull element on the obverse surface of the plate. The plate may further include one or more indentations formed along the perimeter of the plate.

The apertures formed by the plate may increase in area from the reverse surface of the plate to the obverse surface of the plate. These apertures may be conical, cylindrical, or any of a variety of tapered openings including elongated tapered slots. Furthermore, the apertures formed by the plate may have frustoconical wall portions. Alternatively, these apertures may have both frustoconical and cylindrical wall portions. Inlets and outlets of the apertures, as defined by the reverse and obverse surfaces, respectively, may be elliptical, rectangular, circular, or any of a variety of alternative shapes. Additionally, the plate may form one or more aperture connecting channels on either or both of the obverse and reverse surfaces of the plate for directing fluid flow.

The press element of the apparatus may include one or more depressions for cradling a user's digits, which element may be disposed in, be substantially level with, or be raised above the obverse surface of the plate. The pull element of the apparatus may include a peg, a single loop, or a double-looped handle, as desired.

The apparatus may further include a magnetic element to facilitate removal of a cut lid from the container. This magnetic element may be one magnet centrally disposed in the plate, or alternatively, may include several magnets distributed about the plate. The magnetic element may also include a magnet disposed on an edge of the plate. The apparatus may further include a plunger passing through the plate to facilitate separation of a cut lid from the magnetic element. The plunger may be spring loaded. Alternatively a magnet may be disposed on the plunger in a depression in the plate.

The apparatus may be generally symmetrical about a diametral plane and formed of a polymer material for ease of manufacture.

An additional aspect of the invention is the method of separating a liquid from a material in a container including the steps of providing an apparatus in accordance with the present invention, inserting the apparatus into an open end of the container, compressing the comestible material with the apparatus, and tilting the container to drain the liquid. In yet another embodiment, the above method further includes the steps of first cutting an end of the container to release a lid, removing the released lid with the magnet, and actuating the plunger to separate the released lid from the magnet.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION OF THE INVENTION

Figure 1:
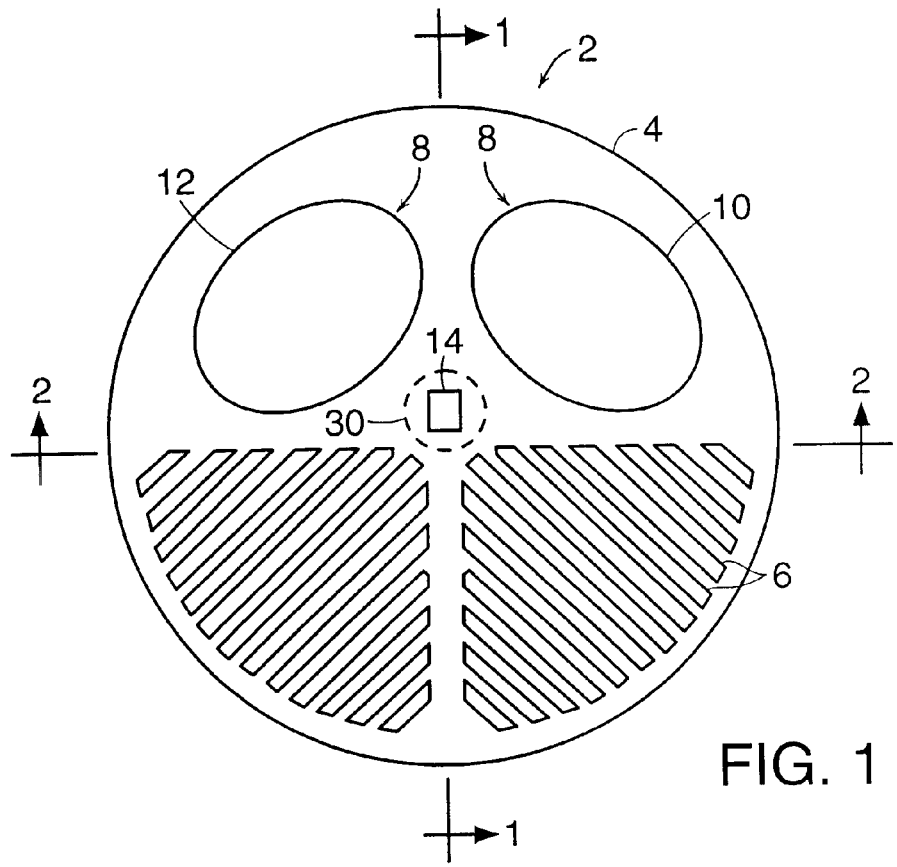
FIG. 1 is a schematic top plan view of a first embodiment of the present invention.

FIG. 1 is a schematic top plan view of a food processing apparatus 2 in accordance with the present invention. The apparatus 2 is in the form of a plate 4 and is generally symmetrical about a diametral plane perpendicular to the plate 4, bisecting the plate 4 along line 1—1. The plate 4 forms a plurality of tapered slot apertures 6 passing therethrough. Disposed on an obverse surface 18 of the plate 4 is a press element 8. The press element 8 includes two digit presses 10, 12 raised above the obverse surface 18 of the plate 4. The apparatus 2 also includes a pull element 14 raised above the obverse surface 18 of the plate 4 for grasping by a user.

Figure 2:
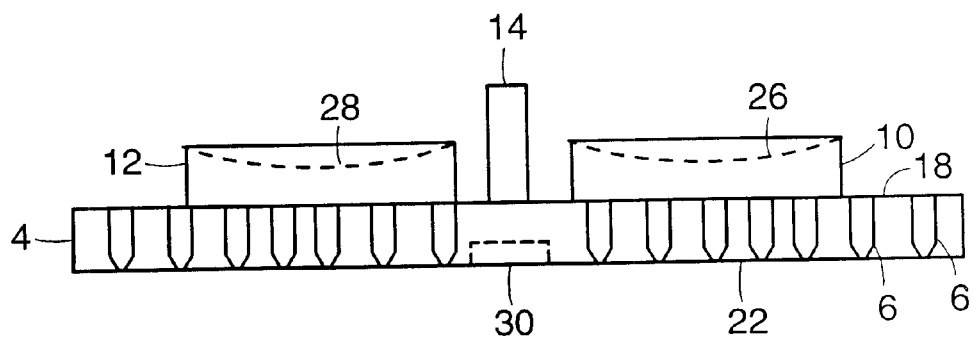
FIG. 2 is a schematic cross-sectional side view taken along line 2—2 of FIG. 1.

FIG. 2 is a schematic cross-sectional side view of the apparatus 2 taken along line 2—2 of FIG. 1. Each digit press 10, 12, forms a depression 26, 28 therein, for cradling a user's thumbs. The apertures 6 increase in cross-sectional area from a reverse surface 22 of the plate 4 to the obverse surface 18 of the plate 4. It can be appreciated that the relatively small aperture area on the reverse surface 22 of the plate 4 prevents the material from passing through the apertures 6 when the reverse surface 22 of the plate 4 is pressed against the material in the container, while the increasing area of the apertures facilitates liquid flow through the apertures 6. Furthermore, it can be appreciated that this increasing aperture area also facilitates cleaning the apparatus 2 between uses since material which enters the apertures from the reverse surface 22 are readily dislodged, for example by a water jet or spray.

The apparatus 2 further includes a magnetic element 30 flush with the reverse surface 22 of the plate 4. The magnetic element 30 can be used to remove the lid from a container by contacting the magnetic element 30 with the lid and removing the apparatus 2 and the lid by use of the pull element 14, thereby eliminating contact between the user and a sharp edge of a container lid during removal of the lid from the container. The pull element 14 may be a peg, tab, ring, or other graspable feature.

A variety of sterilizable rigid materials may be used for the plate 4, digit presses 10, 12 and the pull 14, including polymer materials and metals such as aluminum or stainless steel. One or more of the parts of the apparatus 2 may be joined by bonding, for example, with epoxy resin. Alternatively, the apparatus 2 may be manufactured in one piece, for example, by molding a polymer material in the desired configuration. Subsequent machinery of additional features and details may be required. It can be appreciated that the press element 8 may alternatively include solely one digit press 10 centrally disposed on the plate 4 or which may be formed in the obverse surface 18 of the plate. This press element 8 may include one or more depressions to accommodate a user's digit(s).

Figure 3:
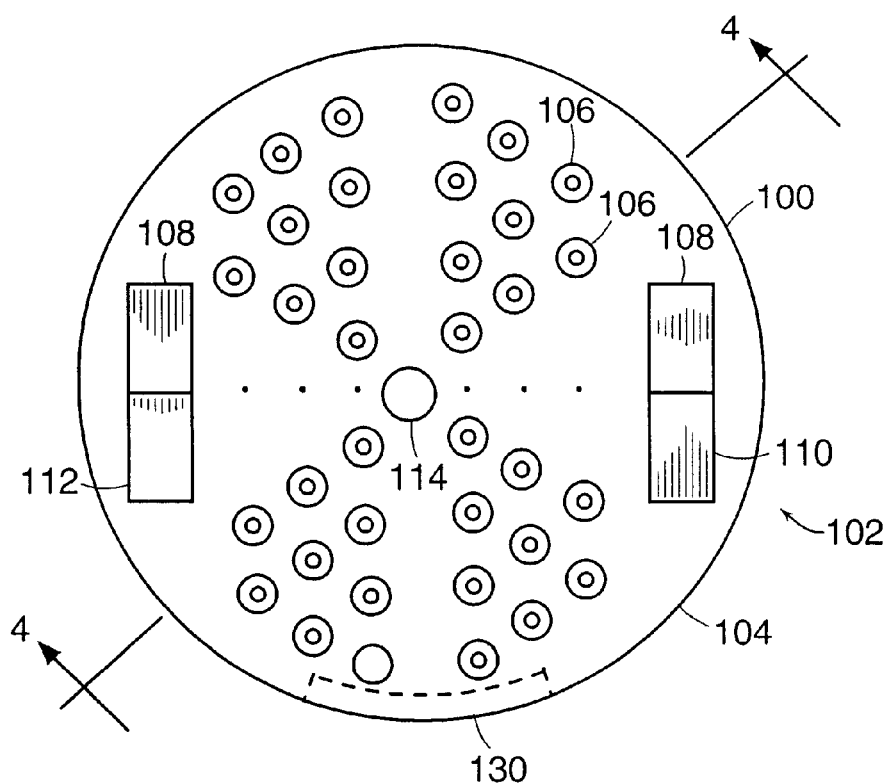
FIG. 3 is a schematic top plan view of another embodiment of the present invention.

FIG. 3 is a schematic top plan view of an alternative embodiment apparatus 102 of the present invention. The apparatus 102 includes a plate 104 wherein a plurality of circular apertures 106 are formed. The apparatus 102 also includes a press element, shown generally at 108. The press element 108 includes two digit presses 110, 112 raised above the surface of the plate 104. The apparatus 108 also includes a magnetic element 130 and a centrally disposed pull element 114 raised above the surface of the plate 104, although the digit presses 110, 112 could be used for this purpose and the pull element 114 eliminated. In this embodiment, the magnetic element 130 is disposed on an edge of the plate 104 such that a container lid can be retrieved from the container by contacting the edge of the plate 104 containing the magnetic element 130 with the lid and removing both the apparatus 102 and the lid from the container.

Figure 4:
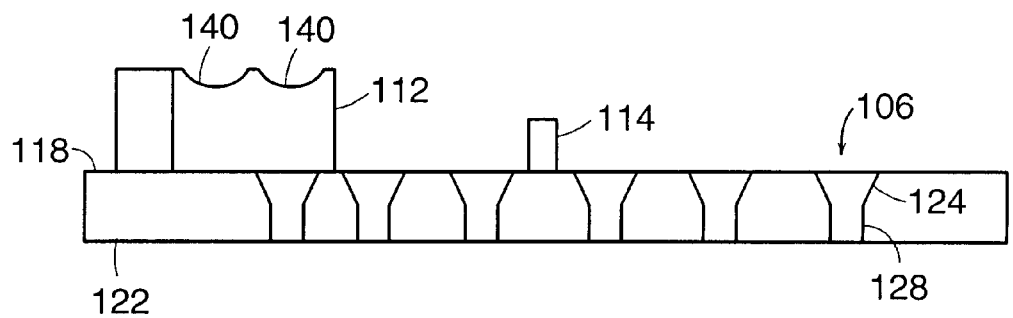
FIG. 4 is a schematic cross-sectional side view taken along line 4—4 of FIG. 3.

FIG. 4 is a schematic cross-sectional side view of the apparatus 102 taken along line 4—4 of FIG. 3. Each aperture 106 has a frustoconical wall portion 124 which decreases in diameter from an obverse surface 118 of the plate 104 in the direction of a reverse surface 122 of the plate 104, where it meets a cylindrical wall portion 128 extending to the reverse surface 122 of the plate 104. Like the previous embodiment, this increase in area of the apertures 106 from the reverse surface 122 of the plate 104 to the obverse surface 118 of the plate 104 serves to impede passage of material from the container through the apertures 106 while allowing liquid to pass through freely. It can also be seen that each digit press, for example at 112, includes two depressions 140 for cradling digits such as first and second fingers of each hand. It can further be appreciated that the height of the digit presses 110, 112 allows for the liquid to pass through the apertures 104 and away from the container and apparatus 102 without contacting the hands of the user.

Figure 5:
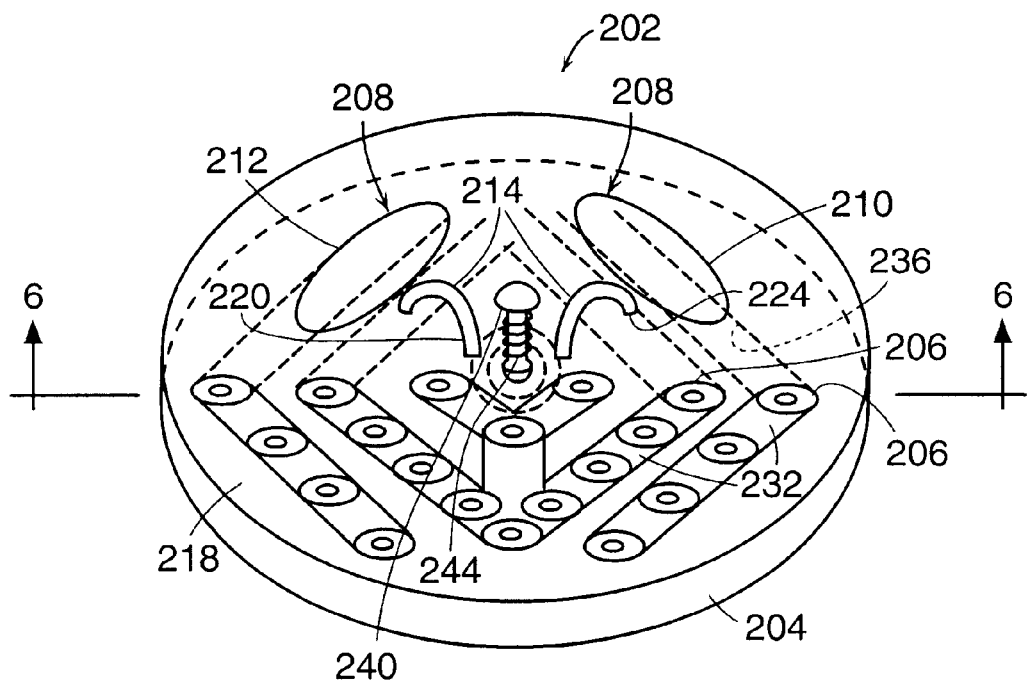
FIG. 5 is a schematic perspective view of yet another embodiment of the present invention.

FIG. 5 is a schematic perspective top plan view of another embodiment apparatus 202 of the present invention. The apparatus 202 includes a plate 204, a plurality of generally tapered apertures 206, a press element 208 consisting of two digit presses 210, 212 raised above an obverse surface 218 of the plate 204, a pull element 214, a magnetic element 230, and a plunger 240 with a spring 244.

The pull element 214 includes two open loops 220, 224 to facilitate grasping by first and second fingers of a user. Alternatively, the pull element 214 may include one open loop or one or more closed loops.

Aperture connecting channels 232 are formed by the obverse surface 218 of the plate 204, so that liquid flowing through the apertures 206 is directed along the obverse surface 218 of the plate 204 in a desired direction. Further, aperture connecting channels 236 may be formed by a reverse surface 222 of the plate 204. When pressure is applied to the apparatus 202 via the digit presses 210, 212, liquid may travel readily from the material in the container along the aperture connecting channels 236 on the reverse surface 222 of the plate 204, to the apertures 206, thus reducing the probability of liquid and material being forced between the edge of the plate 204 and the container.

Figure 6:
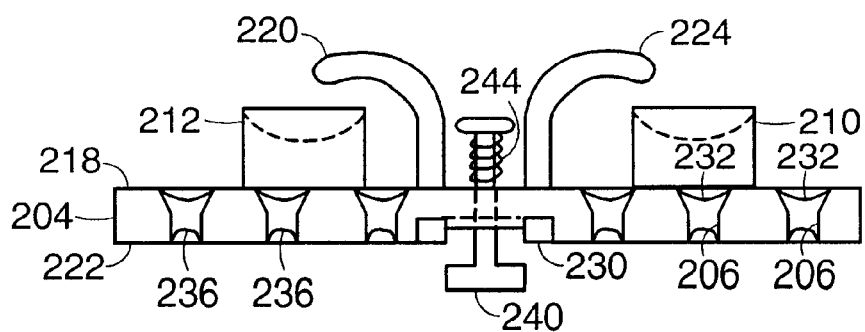
FIG. 6 is a schematic cross-sectional side view taken along line 6—6 of FIG. 5.

FIG. 6 is a schematic cross-sectional side view of the apparatus 202 taken along line 6—6 of FIG. 5. It can be seen that the annular magnetic element 230 is centrally disposed, flush with the reverse surface 222 of the plate 204. The plunger 240, also centrally disposed on the plate 204, passes through the plate 204 and the annular magnetic element 230. A compression spring 244 (depicted partially compressed) is wound around the plunger 240 on the obverse surface 218 of the plate 204. Accordingly, a lid may be safely removed from a container by contacting the magnetic element 230 with the lid, removing the apparatus 202 from the container, and then actuating the plunger 240, which operates to compress the spring 244, and remove the lid from contact with the magnetic element 230. When the operator releases the plunger 240, the spring 244 expands to its original length, thereby returning the plunger 240 to its original position flush with the reverse surface of the plate 202. It can be appreciated that the magnetic element 230 may include more than one magnet distributed about the reverse surface 222 of the plate 204.

Alternatively, the magnetic element could be attached to an end of the plunger, such that before actuation, the magnetic element is recessed into the reverse surface of the plate. A lid can then be safely removed from a container by actuating the plunger, which operates to compress the spring and expose the magnet beyond the reverse surface of the plate, contacting the magnet with the lid, and removing the apparatus and lid from the container. The lid may then be safely disposed of by releasing the plunger, which allows the spring to expand and the magnet to return to its recessed position, thereby releasing the lid from contact with the magnet.

Figure 7:
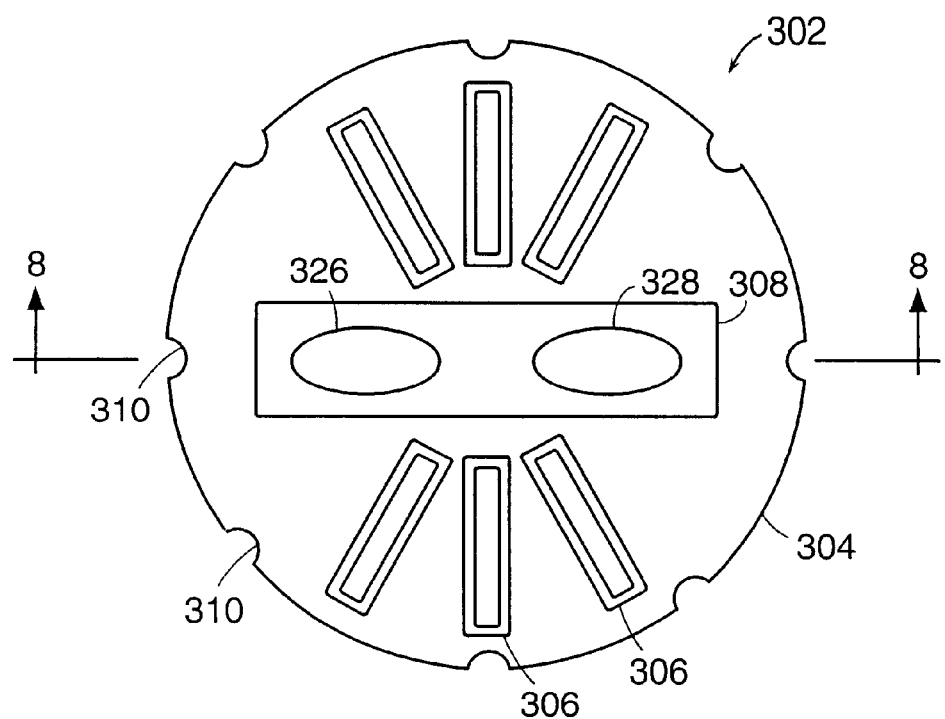
FIG. 7 is a schematic top plan view of another embodiment of the present invention.

FIG. 7 is a schematic top plan view of yet another alternate embodiment apparatus 302 of the present invention. The apparatus 302 includes a plate 304, having a plurality of tapered slot apertures 306 formed therein. Centrally disposed on the obverse surface 318 of the plate 304 is a thumb press 308 allowing the user to rock the apparatus 302 while pressed against the material in the container. A plurality of semicircular indentations 310 are formed at equal distances from each other around the perimeter of the plate 304 to filthier facilitate drainage of liquid. These indentations 310 may be of various shapes including triangular, rectangular, and wave-shaped, as desired.

Figure 8:
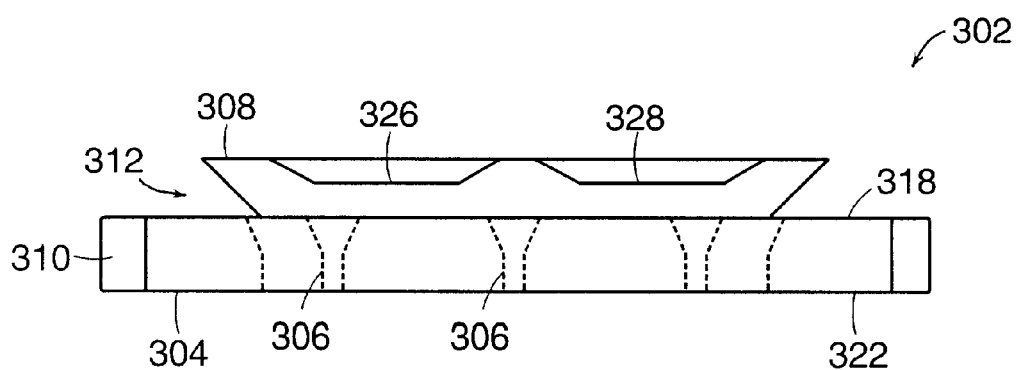
FIG. 8 is a schematic cross-sectional view taken along line 8—8 of FIG. 7.

FIG. 8 is a schematic cross-sectional side view of the apparatus 302 taken along line 8—8 of FIG. 7. The thumb press 308 is raised above the obverse surface 318 of the plate 304 and includes depressions 326, 328 formed therein for cradling a user's thumbs. The sides of the thumb press 308 are angled inwardly towards the obverse surface 318 of the plate 304, thereby forming a tapered gutter 312 for liquid runoff. In this embodiment, the thumb press 308 serves as both the press element and the pull element. The tapered aspect of the thumb press 308 facilitates grasping and removal of the apparatus 302 from a container by allowing the user to grip the thumb press 308 more easily than if there were no taper.

It can be further appreciated that apertures of any shape, pattern, number, and distribution are encompassed by the invention, including, but not limited to, a screen formed by the plate having a relatively large number of apertures per unit surface area with or without tapered walls.

In order to use the apparatus, a user need simply cut an end of a container to release the lid and remove the lid with the magnetic element. If so equipped, the plunger can be actuated to separate the released lid from the magnetic element. Thereafter, the apparatus can be rinsed if desired to remove any contaminants therefrom and then inserted into the open end of the container with the reverse side in contact with the comestible material. Then the liquid is drained by manually grasping and tilting the container while and squeezing the apparatus and the container together to compress the material therein. By sizing the plate to be relatively thick, substantially matching a cross-section of the container, and further providing a plurality of tapered apertures distributed about one half or more of the plate, the liquid can be removed readily with substantially no loss of the comestible material. The more force applied to squeeze the material, the more liquid will be removed, especially with comestibles such as canned tuna fish.

In an exemplary embodiment for use in draining the liquid from a can of tuna, the plate has a diameter of about 3.25 inches (8.26 cm) and a thickness of about 0.25 inches (0.64 cm). The tapered apertures have a diameter proximate the reverse side preferably between about 0.125 inches (0.318 cm) and 0.25 inches (0.64 cm), and a diameter proximate the obverse side of about 0.188 inches (0.478 cm) or greater. The apertures are configured in a regular pattern on at least about 0.25 inch (0.64 cm) centers and may be machined by countersink drilling. Elliptical press elements such as those depicted in FIGS. 1 and 2 have a major dimension of about 1.25 inches (3.18 cm) and a minor dimension of about 1.0 inches (2.5 cm). Each may be manufactured of 0.25 inch (0.64 cm) thick material bonded to the plate and may have a depression formed or machined therein by milling to about one half of the thickness to provide a suitable cradle for a user's thumb. Rectangular press elements such as that depicted in FIGS. 7 and 8 have a width of about 1.0 inches (2.5 cm) and a length of about 2.25 inches (5.71 cm). These values are exemplary in nature and smaller and greater values are considered within the scope of the invention and will depend on the nature of the comestible and the fluid as well as the size of the container.

While there have been described herein what are to be considered exemplary and preferred embodiments of the present invention, other modifications of the invention will become apparent to those skilled in the art from the teachings herein. For example, one or more sharp-edged protrusions may be provided extending from the reverse surface of the plate to pierce the comestible or a wrapping disposed thereabout, as in the case of canned crab meat, to further facilitate drainage of the liquid. It is therefore desired to be secured in the appended claims all such modifications as fall within the spirit and scope of the invention. Accordingly, what is desired to be secured by Letters Patent is the invention as defined and differentiated in the following claims.

What is claimed is:

1. An apparatus for separating a liquid from a comestible material in a container, the apparatus comprising:
    a plate configured to substantially match an inner planar contour of the container, the plate having an obverse surface and a reverse surface;
    a plurality of apertures formed by the plate; and
    a press element and a pull element on the obverse surface of the plate, wherein the pull element comprises a generally centrally disposed raised portion and the press element comprises at least one depression formed therein for cradling a digit.

2. The apparatus according to claim 1 wherein the plate further comprises a plurality of indentations formed along a perimeter of the plate.

3. The apparatus according to claim 1 wherein the apertures increase in area from a reverse surface of the plate to the obverse surface of the plate.

4. The apparatus according to claim 3 wherein the apertures comprise frustoconical wall portions.

5. The apparatus according to claim 4 wherein the apertures further comprise cylindrical wall portions.

6. The apparatus according to claim 3 wherein the apertures comprise tapered slots.

7. The apparatus according to claim 3 further comprising one or more aperture connecting channels formed by the plate.

8. The apparatus according to claim 7 wherein the one or more aperture connecting channels are formed on the obverse surface of the plate.

9. The apparatus according to claim 1 further comprising one or more channels formed on the reverse surface of the plate.

10. The apparatus according to claim 1 wherein the press element is raised above the obverse surface of the plate.

11. The apparatus according to claim 1 wherein the pull element further comprises a double-looped handle.

12. The apparatus according to claim 1 wherein the plate further comprises a magnetic element.

13. The apparatus according to claim 12 wherein the magnetic element is centrally disposed on the plate.

14. The apparatus according to claim 12 wherein the apparatus further comprises a plunger passing through the plate.

15. The apparatus according to claim 14 wherein the plunger is spring loaded.

16. The apparatus according to claim 1 wherein the apparatus is generally symmetrical about a diametral plane.

17. The apparatus according to claim 1 wherein the plate comprises a polymer material.

18. A method of separating a liquid from a comestible material in a container, the method comprising the steps of:
    providing an apparatus comprising:
        a plate configured to substantially match an inner planar contour of the container, the plate having an obverse surface and a reverse surface;

a plurality of apertures formed by the plate; and a press element and a pull element on the obverse surface of the plate, wherein the pull element comprises a generally centrally disposed raised portion and the press element comprises at least one depression formed therein for cradling a digit;

inserting the apparatus into an open end of the container;

compressing the comestible material with the apparatus to separate the liquid from the comestible material; and tilting the container to drain the liquid.

19. The method according to claim 18 wherein the apparatus further comprises a magnet and a plunger and the method further comprises the steps of:

first cutting an end of the container to release a lid;

removing the released lid with the magnet; and actuating the plunger to separate the lid from the magnet.

20. The apparatus according to claim 1 wherein the pull element is tapered.

* * * * *